(12) United States Patent
Kellum et al.

(10) Patent No.: US 10,769,348 B1
(45) Date of Patent: Sep. 8, 2020

(54) DYNAMIC TYPESETTING

(71) Applicant: TYPETURA LLC, Arlington, VA (US)

(72) Inventors: Scott Kellum, Arlington, VA (US); Ana Monroe Fitzner, Arlington, VA (US)

(73) Assignee: TYPETURA LLC, Arlington, VA (US)

( * ) Notice: Subject to any disclaimer, the term of this patent is extended or adjusted under 35 U.S.C. 154(b) by 0 days.

(21) Appl. No.: 16/579,822

(22) Filed: Sep. 23, 2019

(51) Int. Cl.
*G06F 40/109* (2020.01)
*G06F 40/14* (2020.01)
*G06F 40/106* (2020.01)
*G06F 3/0484* (2013.01)

(52) U.S. Cl.
CPC .......... *G06F 40/109* (2020.01); *G06F 40/106* (2020.01); *G06F 40/14* (2020.01); *G06F 3/04842* (2013.01)

(58) Field of Classification Search
None
See application file for complete search history.

(56) References Cited

U.S. PATENT DOCUMENTS

| | | | | |
|---|---|---|---|---|
| 7,228,501 | B2 * | 6/2007 | Brown | G06F 17/214 |
| | | | | 715/234 |
| 10,019,415 | B1 * | 7/2018 | Wombell | G06K 9/00765 |
| 10,416,877 | B2 * | 9/2019 | Rucine | G06K 9/222 |
| 2004/0225956 | A1 * | 11/2004 | Beezer | G06F 17/218 |
| | | | | 715/205 |
| 2007/0192686 | A1 * | 8/2007 | Fortes | G06F 17/211 |
| | | | | 715/244 |
| 2010/0211866 | A1 * | 8/2010 | Nicholas | G06F 17/212 |
| | | | | 715/234 |
| 2012/0218273 | A1 * | 8/2012 | Tsai | G06T 11/60 |
| | | | | 345/467 |
| 2014/0176563 | A1 * | 6/2014 | Kaasila | G06F 17/214 |
| | | | | 345/467 |
| 2014/0195903 | A1 * | 7/2014 | Kaasila | G06F 17/214 |
| | | | | 715/269 |
| 2014/0372870 | A1 * | 12/2014 | Chen | G06F 17/214 |
| | | | | 715/234 |

(Continued)

OTHER PUBLICATIONS

JD Graffam, Introducing Responsive Web Typography with FlowType.JS, Published: Sep. 18, 2013 https://www.smashingmagazine.com/2013/09/introducing-flowtype-js/ (Year: 2013).*

(Continued)

*Primary Examiner* — Howard Cortes
(74) *Attorney, Agent, or Firm* — Loeb & Loeb LLP

(57) ABSTRACT

A computer implemented method for providing a dynamic typesetting package. The method receives a request from a user for a typesetting package, and the typesetting package includes one or more font, and one or more rendering rules for defining typesetting for various elements of content across layout contexts. In response to a requested typesetting package, the method provides a link to the user. The link references the requested typesetting package. The method matches at least a portion of the elements of the content to one or more parameters in the one or more rendering rules. The one or more rendering rules, in response to an execution by a computerized device having a display, the content is dynamically typeset for the display.

20 Claims, 18 Drawing Sheets

(56) References Cited

U.S. PATENT DOCUMENTS

| | | | |
|---|---|---|---|
| 2015/0095768 A1* | 4/2015 | Rimmer | G06F 17/211 |
| | | | 715/238 |
| 2015/0161087 A1* | 6/2015 | Khoo | G06F 16/957 |
| | | | 715/234 |
| 2017/0075547 A1* | 3/2017 | MacLean | G06F 3/04845 |
| 2017/0300456 A1* | 10/2017 | Rimmer | G06F 17/248 |
| 2018/0011818 A1* | 1/2018 | Zhao | G06F 17/212 |
| 2018/0114059 A1* | 4/2018 | Ric | G06K 9/00865 |
| 2018/0239775 A1* | 8/2018 | Kidambi | G06F 17/211 |
| 2018/0276182 A1* | 9/2018 | O'Donovan | G06F 17/211 |

OTHER PUBLICATIONS

FlowType.JS, Simple Focus, Captured Jul. 1, 2017 https://web.archive.org/web/20170701075801/https://simplefocus.com/flowtype/ (Year: 2017).*

Zell Liew, Everything about the Modular Scale Sass Library and Modular Scale with Typi, Published: May 25, 2016 https://zellwk.com/blog/modular-scale/ (Year: 2016).*

Jake Wilson, Fluid Responsive Typography With CSS Poly Fluid Sizing, May 2017 pp. 1-24 https://www.smashingmagazine.com/2017/05/fluid-responsive-typography-css-poly-fluid-sizing/ (Year: 2017).*

Andy Phillips, Integrating flowtype.js with wordpress, LMAX Exchange, Published: Mar. 9, 2016, pp. 1-3 https://www.lmax.com/blog/staff-blogs/2016/03/09/integrating-flowtype-js-wordpress/ (Year: 2016).*

Zell Liew, Responsive Modular Scale, Published: May 11, 2016 pp. 1-12 https://zellwk.com/blog/responsive-modular-scale/ (Year: 2016).*

Ricardo, Cold Type for Cold Brews, May 16, 2018 pp. 1-2 https://www.getrevue.co/profile/coffeetabletypography/issues/52-cold-type-for-cold-brews-110287 (Year: 2018).*

* cited by examiner

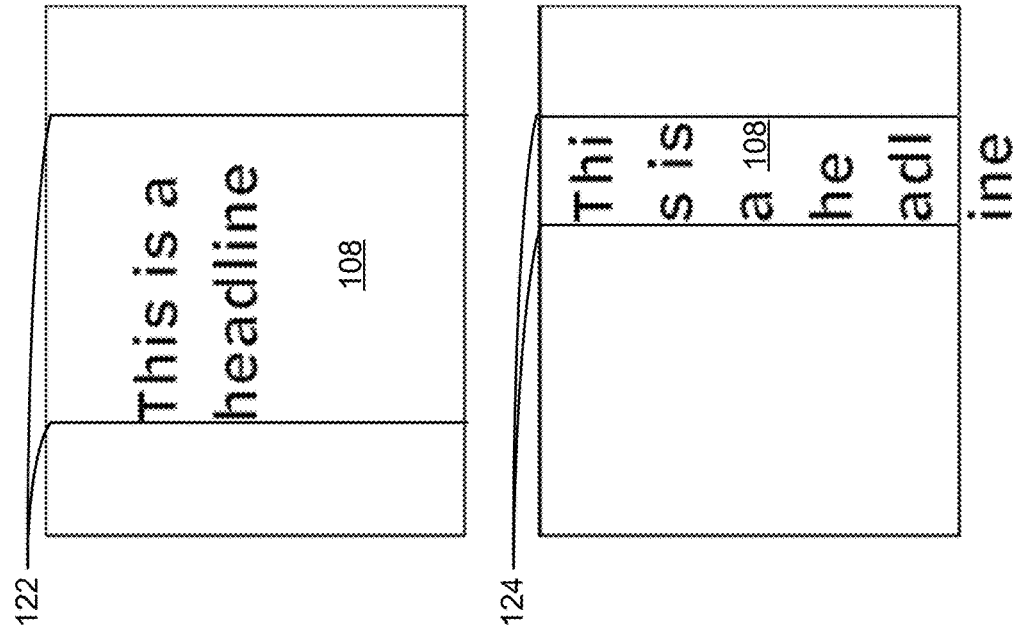

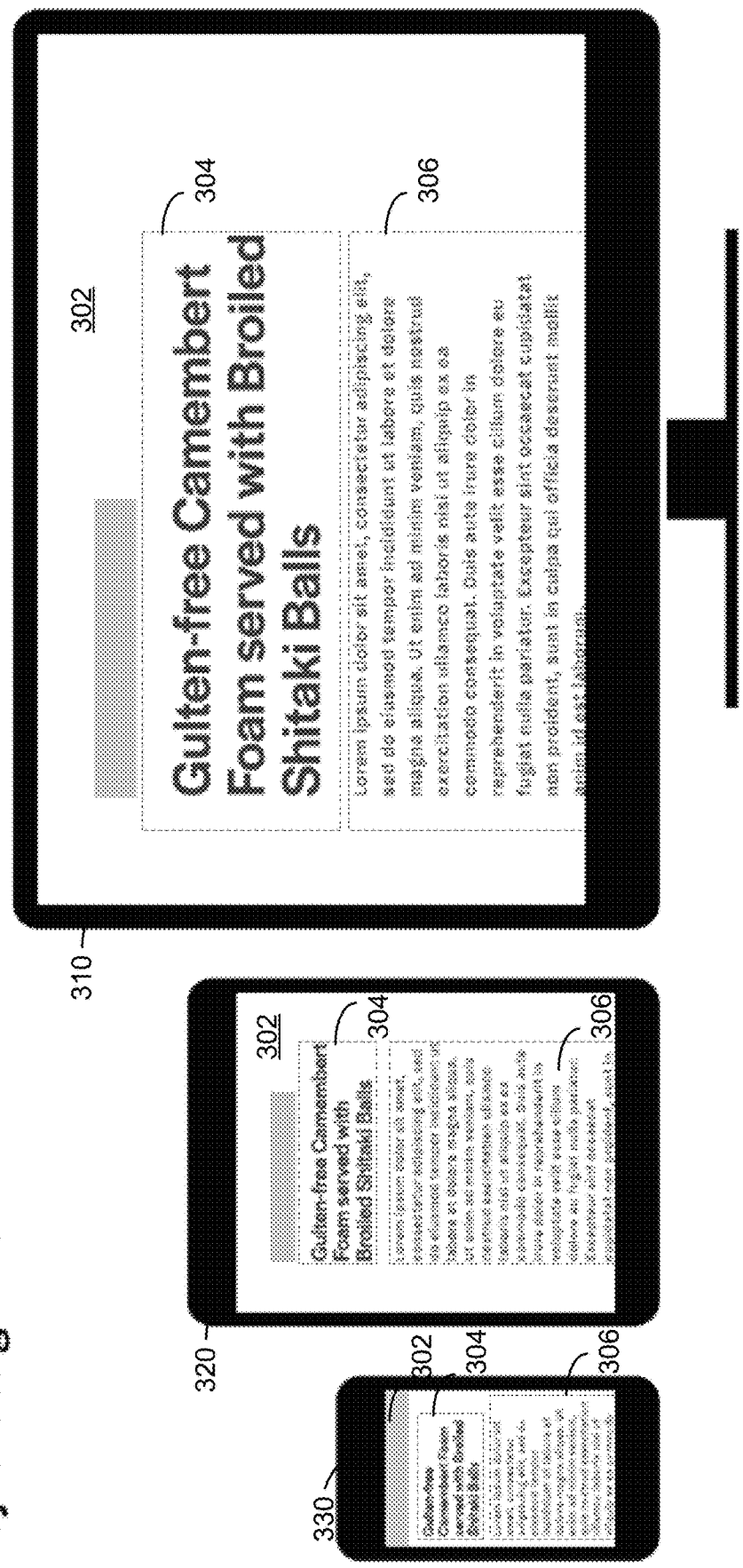

Layout design three

Primary Headline

810 →
The best Restaurants in East LA

802 — `<h1 class="primary-headline">The best Restaurants in East LA</h1>`

Primary Subheadline

812 →
Explore hot new restaurants in the most trendy neighborhoods

804 — `<h2 class="primary-subheadline">Explore hot new restaurants in the most trendy</h2>`

Meta Information

814 →
May 17, 2019

806 — `<h3 class="meta">May 17, 2019</h3>`

DYNAMIC TYPESETTING

TECHNICAL FIELD

Embodiments discussed herein generally relate to typesetting provisioning in web design.

BACKGROUND

Developers and programmers design and code web pages and their contents for a variety of platforms and devices. Websites are made to scale to a variety of sizes. This enables them to work on phones, tablets, and desktop computers. Control over the size of typographic elements, such as headings and paragraphs, lack design and development solutions; as such, programmers and designers need to create complex typographic rules so that text looks good in every context a typographic element is used.

Developers and programmers need to write a significant amount of code to manage typographic variations within layouts because each context in which text might appear needs to be considered and treated. These context variations might be within a side bar vs in the main section of text and also how those layouts change on different devices. Often typesetting is simplified to reduce the amount of code needed resulting in less interesting designs.

Writing his or her own code for these changes has been preferred, but writing appropriate code is still challenging for a small business owner who may have elementary knowledge or ability or those who may have learned a crash course on coding for the web. There are drag and drop web design vendors or hosts that provide design templates for the users, but the users sometimes are limited to the kind of templates provided. In addition, some of the templates lack ability to accommodate to the different display sizes; they the information to provide to the browser to adjust the page content accordingly.

Therefore, embodiments attempt to create a technical solution to address the deficiencies of the challenges above.

SUMMARY

Embodiments create a technical solution to the above challenges by creating an easy to use tool to enable users who wish to build a web content to dynamically tailored to different displays without the need to write the code to accomplish themselves. In addition, aspects of embodiments may further provide a complete typesetting configuration so that with the code above, the web content may be rendered appropriately for the different devices.

BRIEF DESCRIPTION OF THE DRAWINGS

Persons of ordinary skill in the art may appreciate that elements in the figures are illustrated for simplicity and clarity so not all connections and options have been shown. For example, common but well-understood elements that are useful or necessary in a commercially feasible embodiment may often not be depicted in order to facilitate a less obstructed view of these various embodiments of the present disclosure. It may be further appreciated that certain actions and/or steps may be described or depicted in a particular order of occurrence while those skilled in the art may understand that such specificity with respect to sequence is not actually required. It may also be understood that the terms and expressions used herein may be defined with respect to their corresponding respective areas of inquiry and study except where specific meanings have otherwise been set forth herein.

FIGS. 1A to 1B are diagrams illustrating a prior art approach and limitations to rendering web content.

FIGS. 3A to 3C are diagrams illustrating additional examples according to one embodiment.

FIG. 8 is a diagram illustrating exemplary CSS instructions matching a web content according to one embodiment.

FIGS. 9A to 9F are screenshots of contents after packages are applied according to one embodiment.

DETAILED DESCRIPTION

Embodiments may now be described more fully with reference to the accompanying drawings, which form a part hereof, and which show, by way of illustration, specific exemplary embodiments which may be practiced. These illustrations and exemplary embodiments may be presented with the understanding that the present disclosure is an exemplification of the principles of one or more embodiments and may not be intended to limit any one of the embodiments illustrated. Embodiments may be embodied in many different forms and should not be construed as limited to the embodiments set forth herein; rather, these embodiments are provided so that this disclosure may be thorough and complete, and may fully convey the scope of embodiments to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description may, therefore, not to be taken in a limiting sense.

Embodiments may create a system for conveniently create web contents that dynamically adjust to any hardware display medium. The contents no longer rely on the width determination of a browser or a rendering engine. Aspects of embodiments create a package of rules that dynamically adjust the contents as envisioned by the creators regardless of what kind of devices that the contents appear on.

To further illustrate aspects of embodiments, the following terms may be used throughout the disclosure:

A typeface or type may be referred to letters, characters, symbols, and/or glyphs of a similar style across one or more languages;

A font may be referred to as a delivery mechanism for type. In one example, fonts may be but not limited to OpenType, TrueType, WOFF, or WOFF2 file formats and have historically been delivered as cast metal and photographic disks before the days of computer with a display;

A typeset or typesetting may be referred to as how type is used on a page, layout, screen, and/or design. This includes but is not limited to the size, weight, style, line-height, letter spacing (tracking) and word spacing;

Typography may be referred to as an overall practice and outcome of typesetting, lettering, calligraphy, and general application of type;

An element may be referred to as any piece of text with a unique style or function. For example, this includes but is not limited to headlines, subheadlines, section headlines, paragraphs, pullquotes, labels, lists, and captions;

A context or typesetting context may be referred to as variations that may indicate the width available to text, but may also include height, viewport or browser width, ambient light, etc.; and A package may be referred to as a collection of instructions that define typesetting for various elements across contexts.

Figure 1A:
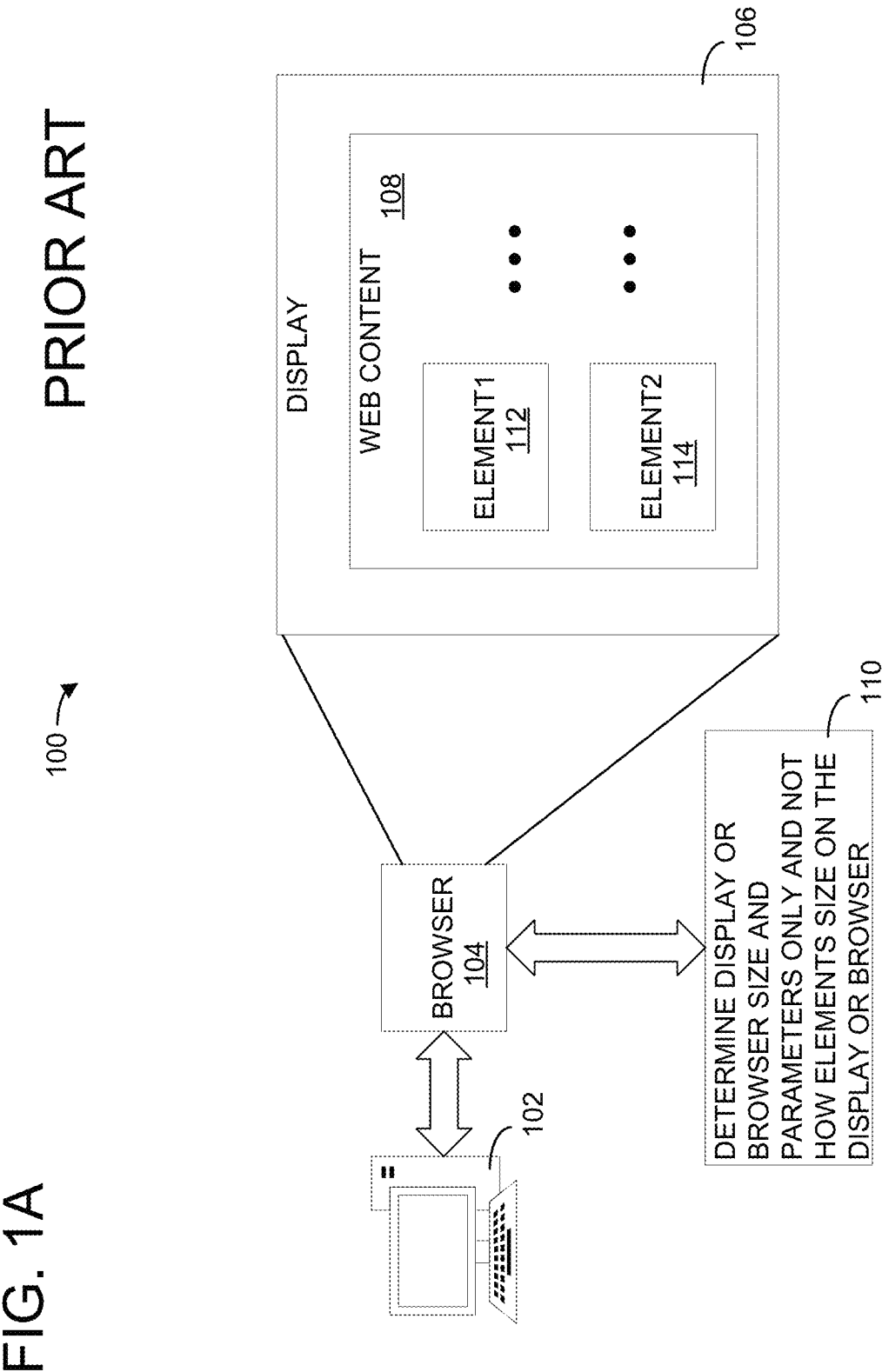

As a further illustration, referring to FIG. 1A, a diagram showing a system 100 demonstrates existing approaches to render or display a web content. The system 100 may include a computing device 102 which includes a browser 104 and a display 106. The browser 104 displays a web content 108. The web content 108 includes elements 112 and 114. The web content 108 also includes other elements and includes scripts. In another embodiment, the web content 108, before rendered by the browser 104 or a rendering engine, may be written in a markup language with specific syntax rules. For example, one such markup language may be a hypertext markup language (HTML). The HTML coded content may include a combination of tags (e.g., <body>, <header>, <tr>, etc.) and attributes and values associated with the tags (e.g., <font size: "3"> or <p style="font-size: 20 px">). As such, the web content, before rendered, may be written in a series of tag declarations with attributes, as well as content (e.g., texts, images, etc.), to be rendered.

However, while the browser 104 determines sizes and parameters of the display 106, the browser 104 fails to execute content size information and recognize any content information in relationship to the display or browser, such as how elements 112 and 114 may be displayed on the display 106 or browser 104. For example, referring to FIG. 1A, a context 122 may define a width of the content 108. However, the context 124 (e.g., with a smaller width than that of the context 122) may not display the complete information of the content 108.

Figure 2A:
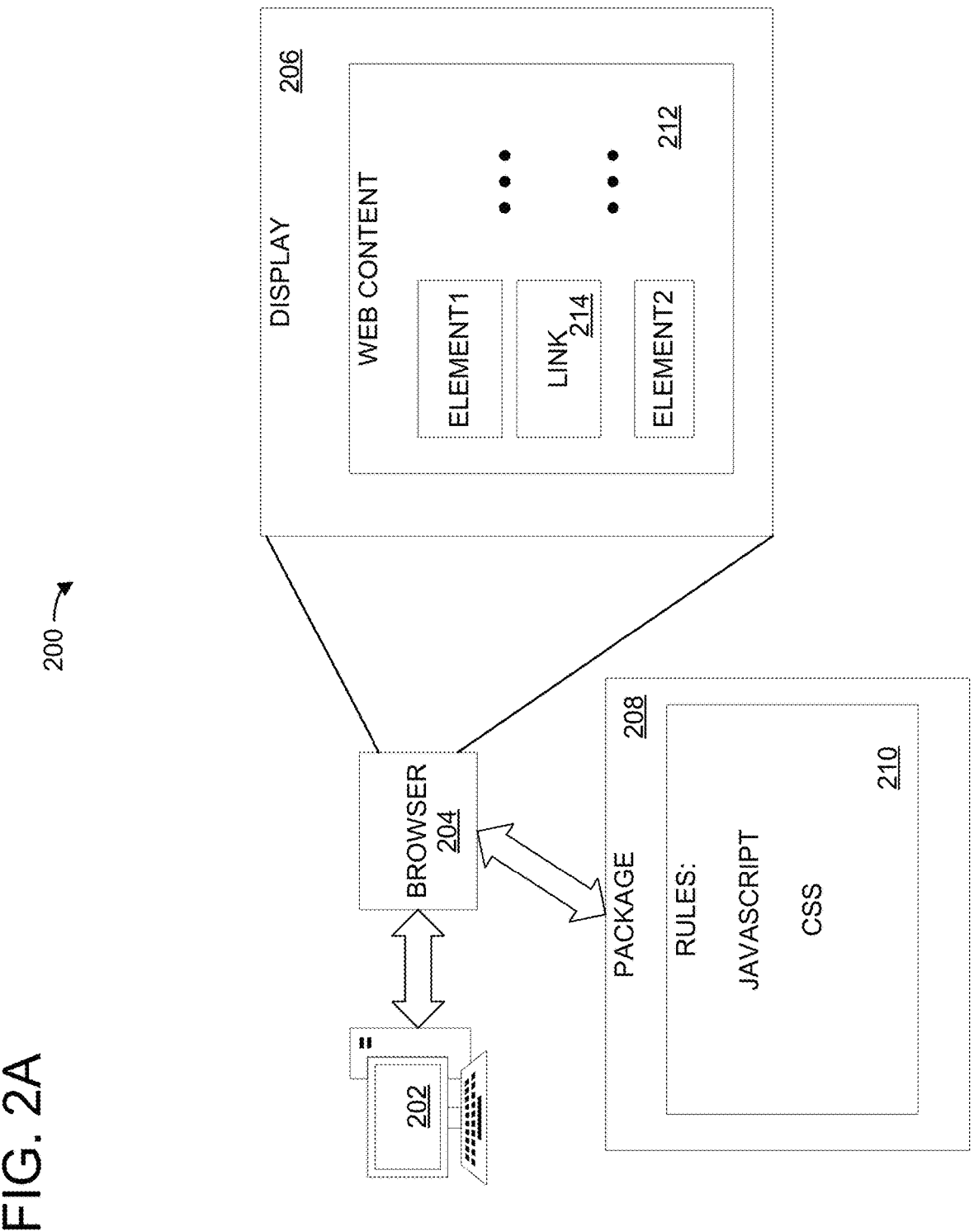
FIGS. 2A to 2B are diagrams illustrating dynamic typesetting according to one embodiment.

Referring now to FIG. 2A, a diagram may illustrate a system 200 according to one embodiment. The system 200 may include a similar configuration as in FIG. 1A, such as a computing device 202 having a browser 204 installed thereon. The computing device 202 may also include a display 206 so that the computing device 202 may display a web content 212 having one or more elements. In one embodiment, the web content 212 may be a content that includes one or more elements therein. In another example, the content 212 may be a content presented on a web browser. In a further example, the content 212 may be rendered or displayed within an app that is installed by a mobile device, such as the one shown in FIG. 5.

One of the differences between the prior art and aspects of embodiments is that aspects of embodiments incorporate a package 208 having a link 214 that references a package that includes a set of rules 210 incorporated therein to dictate how the elements of the web content 212 are to be rendered. The browser 204 is configured to execute the link 214, which references the package 208 and the set of rules 210, and that the rules 210 remove the need for the browser 204 to provide parameter information of the display 206.

For example, the link 214 may be expressed as below:
"<script src="https://cdn.typetura.com/typetura.js"></script>

<link href="https://cdn.typetura.com/magazine-moderne/typetura.css">"

In another embodiment, the link 214 may be added to the content 212 in any part as the browser 204 or a rendering engine may identify and execute the link 214. Moreover, the link 214 references the package 208, and the name of the link 214 may match that of the name of the package 208.

In another embodiment, for example, the set of rules 210 may include a set of JAVASCRIPT instructions that identify contexts of the elements of the web content 212. For example, the JAVASCRIPT may include the following code to identify a width parameter of the display 206, as well as various resolution ratio and display refresh rates.

For example, JAVASCRIPT according to aspects of embodiments may include one or more of the following instructions:

```
function getContext( ){
el.forEach(element=>{
element.style.setProperty('--context', element.off-setWidth)
})
}
getContext( )
window.onresize=getContext
```

The set of rules 210 may further include a set of cascading style sheets (CSS) instructions that may set the rules for each element type and how they should respond or rendered to the context identified by the JAVASCRIPT instructions.

For example, CSS according to aspects of embodiments may include one or more of the following instructions:

The CSS needs to first associate itself with the context provided by the
JAVASCRIPT with a function like this:
*{animation: var(--key) 1s var(--ease) 1
calc(-1s*var(--context)/var(--max)) paused both;}
Then the this association can be used to style an element across this context similar to this:
h1 {
--key: h1;
--max: 1000;
}
@keyframes h1 {
0% {
font-size: 16 px;
}
100% {
font-size: 72 px;
}
}

Figure 7:
FIG. 7 is a diagram illustrating typesetting packages according to one embodiment.

To further illustrate aspects of the invention, FIG. 7 illustrates one or more packages according to one embodiment. In one embodiment, the packages 702, 704, 706, and 708 may be presented on a website or a page of a website for the user to select. In another embodiment, the packages 702, 704, 706, and 708 may be presented to the user on a publisher or a web host so that the end user of the publisher or the web host may select.

Figure 2B:
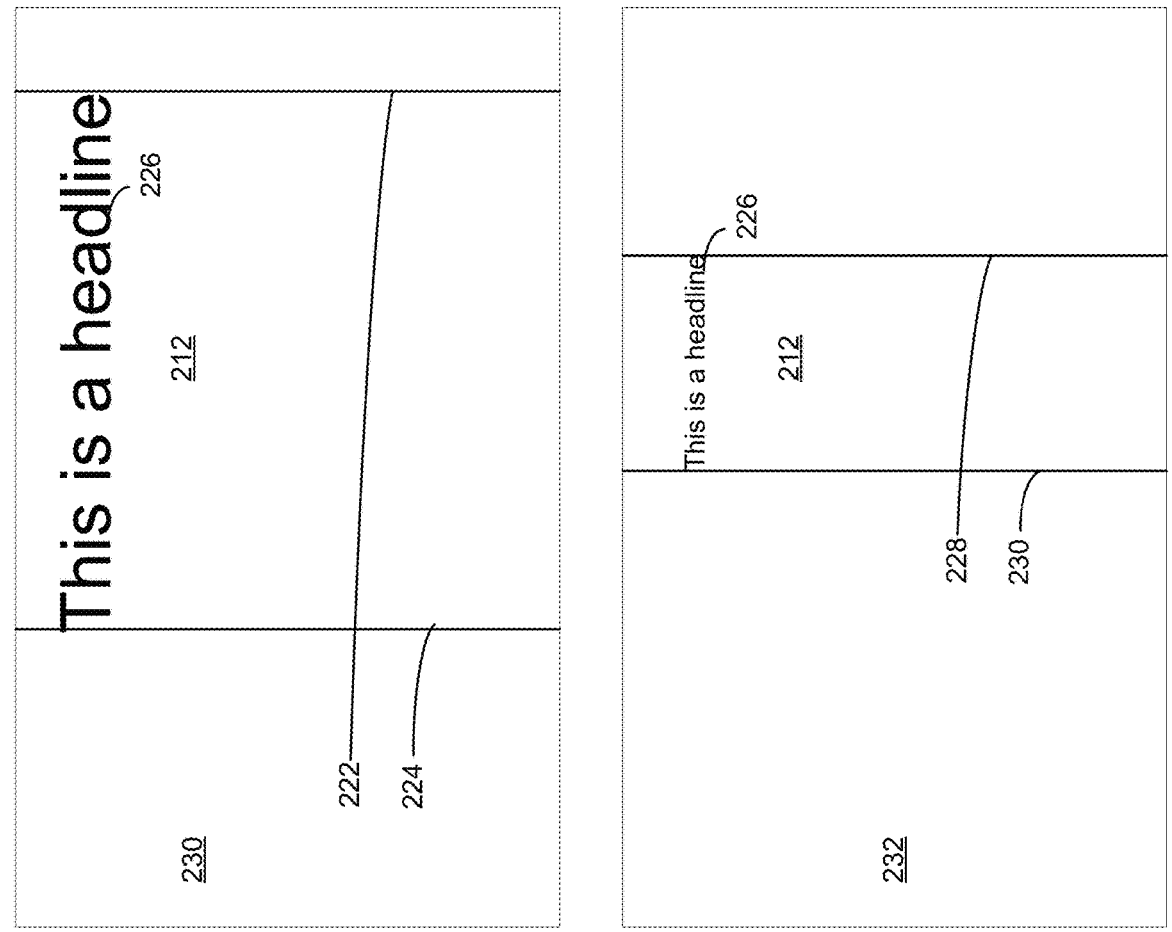

To further illustrate aspects of the invention, FIG. 2B may illustrate diagrams showing how embodiments of the invention differ from those of the prior art, such as shown in FIG. 1B. For example, a first diagram 230 include lines 222 and 224 define a width of a context (e.g., display window or visible window of a browser), which is determined by the set of JAVASCRIPT 210. The content 212, which may include an element 226 as a headline text. The element 226 may be configured by the CSS instructions to render at a given size across the width of the context. In a diagram 232, on the other hand, a new context has been identified based on lines 228 and 230. Unlike FIG. 1B, aspects of embodiments may, after the browser interprets or executes the set of CSS instructions, render the same element 226 at a different size while still maintaining the width of the element 226 being across the width of the context.

Figure 3B:
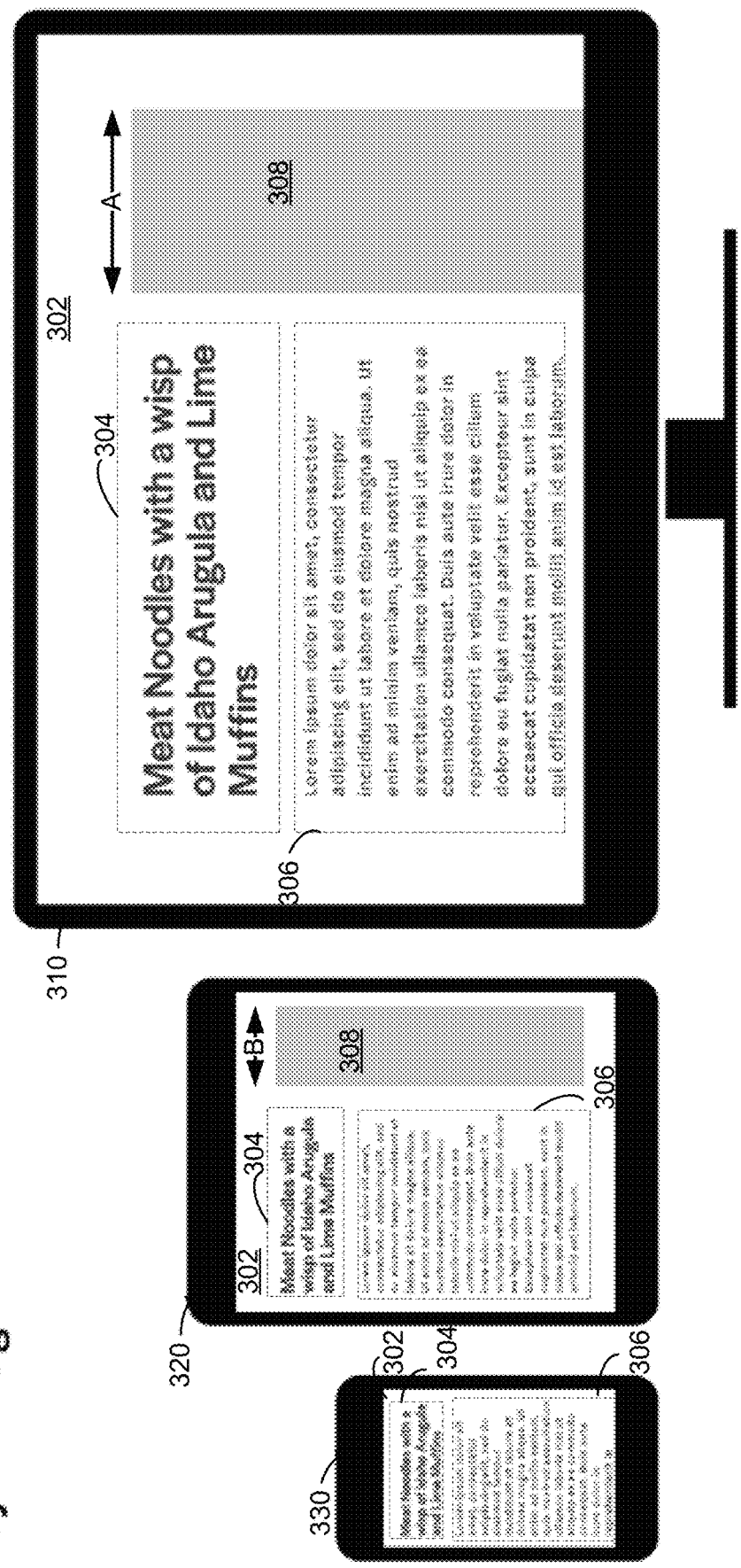
Figure 3C:
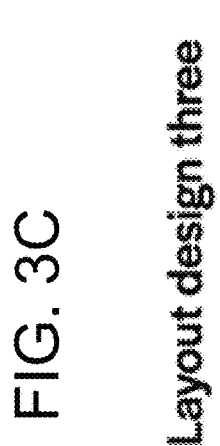

FIGS. 3A to 3C further illustrate exemplary embodiments of the invention. FIG. 3A illustrates one set of arranges of the set of rules of JAVASCRIPT and CSS in the package. For example, suppose a user may wish to publish or post content 302 with elements 304 and 306; the element 304 being designated as a headline whereas the element 306 may be designated as a body. The package provided by aspects of embodiments may define the headline to have a certain size of font and styles such as bold, underline, italics, etc. The body may be further defined to include a certain size of font and styles such as bold, underline, italics, etc., as well as margin from the left and right edges of the display. As such, in FIG. 3A, under a larger display context 310, the elements 304 and 306 may be rendered in such a first layout. In a tablet size display context 320, for example, the elements 304 and 306 are reduced in size according to the CSS rules. Further, in a smartphone display context 330, the elements 304 and 306 are further modified to be suitable for the given context. Note that the margin of the element 306 may be slightly different in the context 330 from the other contexts due to the size of the font, etc.

Referring now to FIG. 3B, another layout 312 is illustrated to demonstrate aspects of embodiments. In this example, similar to that of FIG. 3A, there are elements 304 and 306. However, FIG. 3B may illustrate how elements 304 and 306 are configured with the introduction of a new element 308—a side bar graphics or panel—is introduced as part of the content 302. As such, in the context 310, the element 308 may include a first width A. However, in the context 320, the elements 304 and 306 may further update its width when the element 308 is introduced and that the element 308 may now have a different width B. Further, in the context 330, the element 308 is no longer visible and is absent in this particular context 330. In other words, with the CSS instructions, the user may dictate how an element is rendered as well as whether the element is rendered in a given context at all.

Furthermore, FIG. 3C may illustrate yet another layout 314 according to one embodiment. For example, as shown in the context 310, the content 302 again may include elements 304 and 306. However, the content 302 may now include a secondary headlines 322 and 324 and their respective body 326 and 328. Furthermore, the content 302 may include a side column with the secondary headlines with its organization thereof. For example, secondary headlines 332, 334, and 340 may be of the same size font and style while their body contents 334, 338 and 342 are of another font size and style.

When it comes to the context 320, on the other hand, the side column contents (e.g., 332, 334, 336, 338, 340, and 342) are no longer visible or rendered for viewers. Rather, only 304, 306, 322, 326, 328, and 324 are shown (while 322 and 324 are in side-by-side column). Moreover, the element 304 is still in a larger font size than that of the element 322 due to the package rules (e.g., CSS instructions). Furthermore, the package ensure the typesetting configurations for 304, 322, and 328 are accurate and are transformed from the context 310 to context 320. For example, the size for the headline 304 in the context 310 may be the same as in the context 320 proportionally. The end user does not need to rely on the browser to adjust correctly for the context 320.

In another embodiment, the headlines 332, 334 and 340 along with their body contents 334, 338 and 342 may be found in later section of the content 302 so that the viewers may need to scroll the page.

Yet in another embodiment, in the context 330, the elements 304 and 322 are now in the same size and font as headlines.

As such, with the CSS instructions, aspects of embodiments automatically enable dynamic typesetting to any given content according to the context without the need to wait for the browser or a rendering machine on the displaying device to provide the desirable result—as configured by the content author—to be viewed by viewers of the content.

Figure 9A:
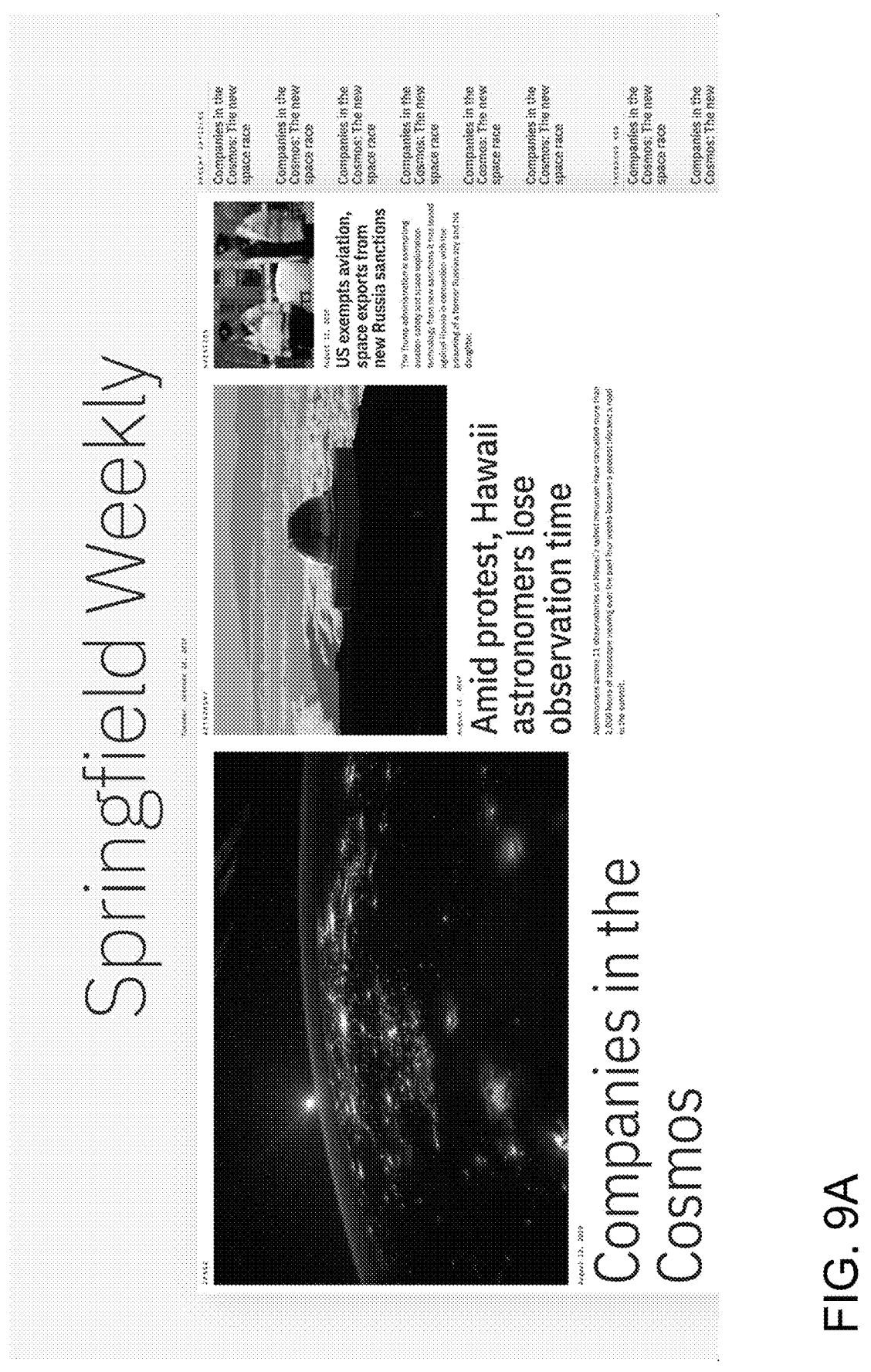
Figure 9B:
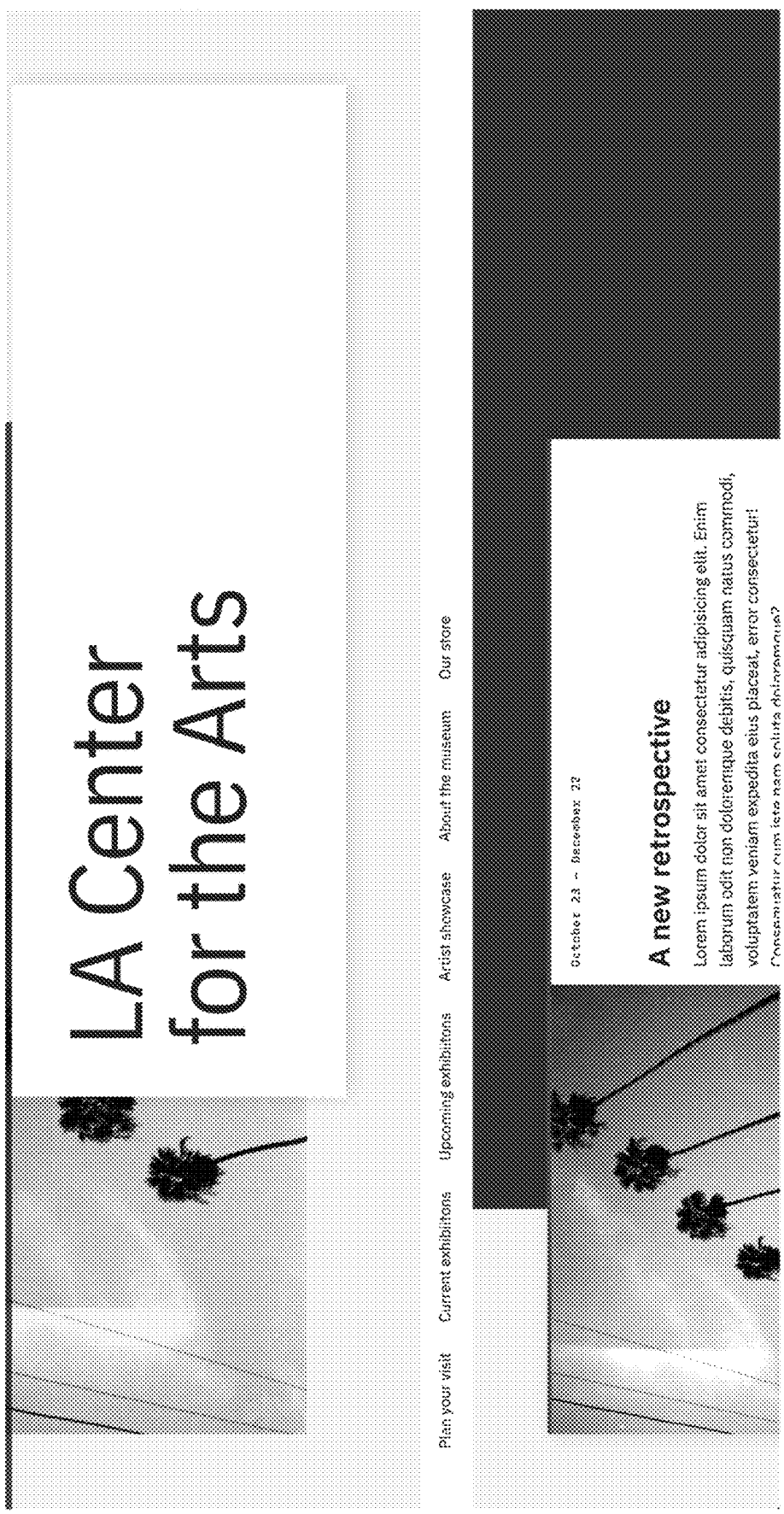
Figure 9D:
Figure 9E:
Figure 9F:
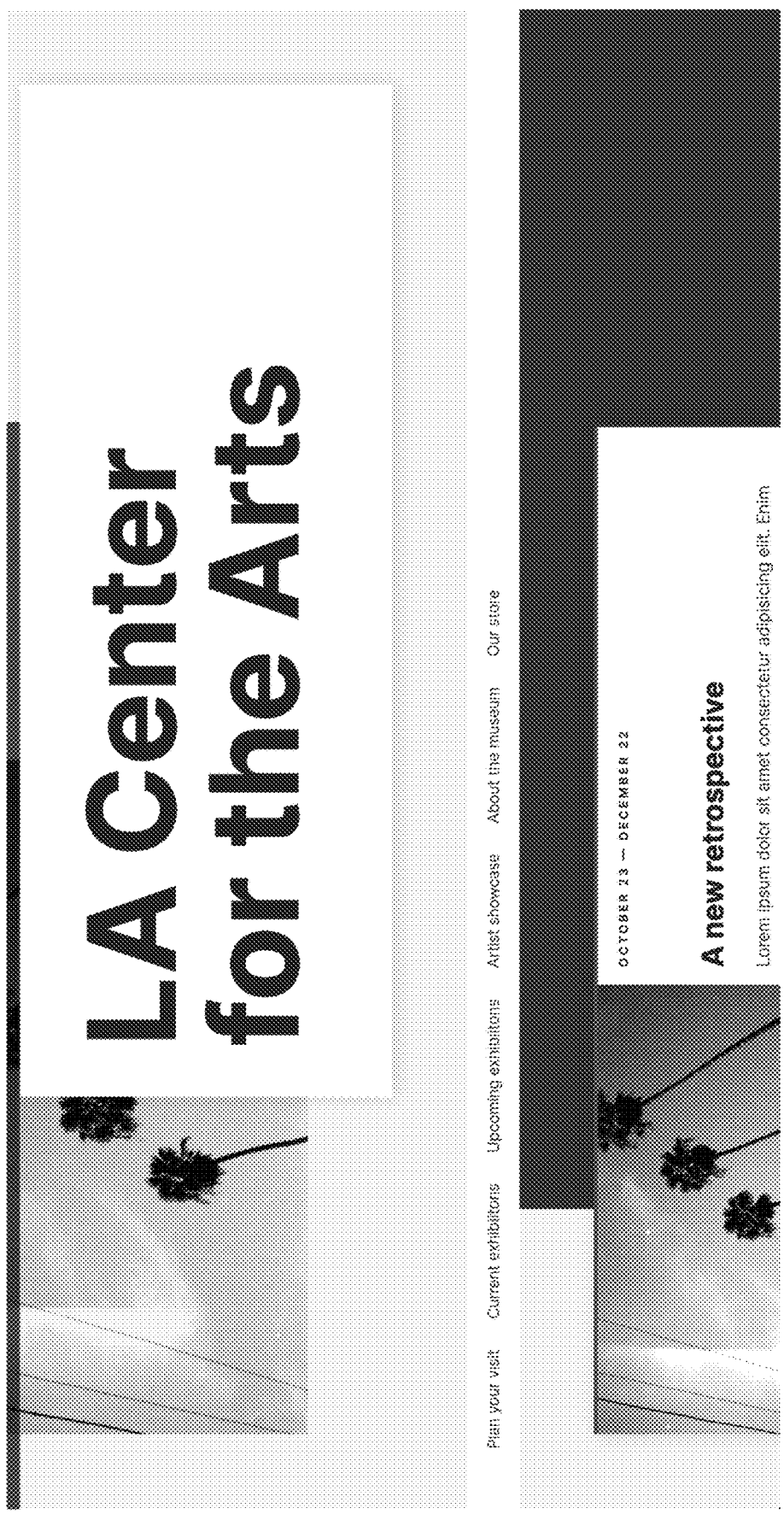

Further examples are shown in FIGS. 9A to 9F. For example, FIGS. 9A and 9B illustrate the rendered content after the package 702 is applied; FIGS. 9C and 9D illustrate the rendered content after the package 704 is used; and FIGS. 9E and 9F illustrate the rendered content after the package 706 is applied.

Figure 4:
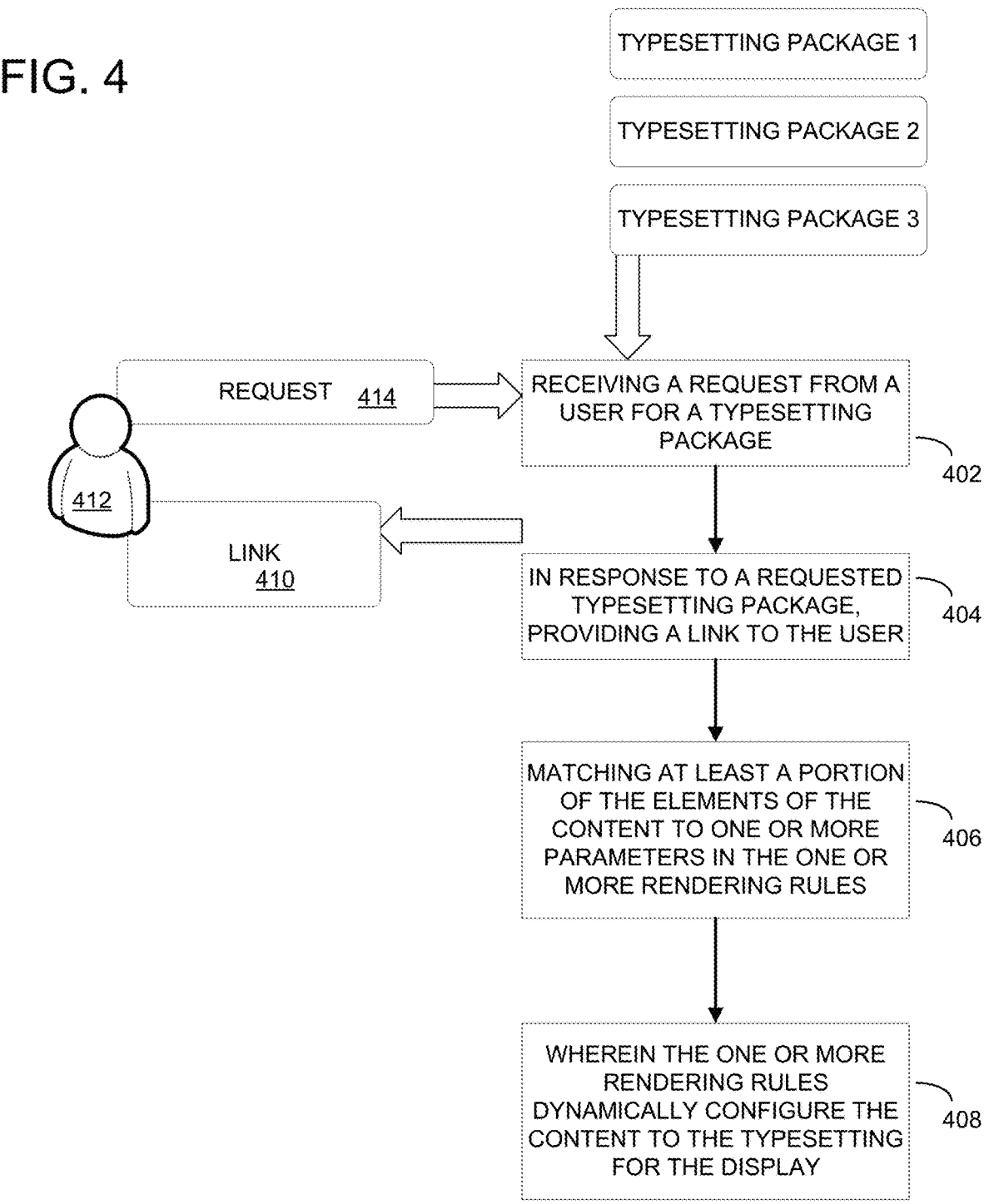
FIG. 4 is a flow chart illustrating a method according to one embodiment.

Referring now to FIG. 4, a flow chart illustrates a method according to one embodiment. At 402, a system (e.g., system 200) may receive a request 414 from a user 412 for a typesetting package. In one embodiment, the typesetting package (e.g., typesetting packages 1, 2 and 3) includes one or more font typeface and one or more rendering rules (e.g., JAVASCRIPT and CSS instructions) for defining a typesetting for various elements of a content from a user across contexts (e.g., contexts 310, 320, and 330). At 404, in response to a requested typesetting package, the system may provide a link 410 to the user 412. In one example, the link 410 may reference the requested typesetting package such as providing a link to a storage area or an address of a database storing the typesetting package. At 406, the system may match at least a portion of the elements of the content to one or more parameters in the one or more rendering rules. For example, the CSS instructions in the typesetting package may identify the different elements such as those shown in FIGS. 3A to 3C. For example, the user 412 may select the elements manually and update the CSS instructions before the content is rendered. In another embodiment, the elements may be automatically identified or parsed by other rules, instructions or engines that may be packaged in the typesetting package. In yet another embodiment, the typesetting package may call relevant functions in the system 100 to perform the parsing and identifying.

To further illustrate this feature, FIG. 8 is a screenshot illustrating packages according to one embodiment. For example, a package having a "primary headline" as one of a typesetting configuration for a headline having a particular sized font and font typeface, as shown in 810. The package may therefore include a set of rules that may identify content and transform the content according to the size or typeface of the "primary headline". With such typesetting defined by the package, aspects of embodiments may identify the web content and match in the content and replace an equivalent headline in the web content. For example, suppose the end user may define a set of style setting for a headline text as "headline #1". Once the end user selects the package as shown in FIG. 8, aspects of embodiments may match "headline #1" to "primary headline" in the package. In response to the matching, the content of the end user may be updated to include "primary headline" in 802 so that once the web content is presented to the browser or the rendering engine, the proper typesetting for the "primary headline" will be rendered.

Similarly, another example of "primary subheadline" 812, with a smaller font size positioned below or under the primary headline 810. Accordingly, the end user's content code may be updated in 804 to "primary-subheadline." Furthermore, a meta information style 814 may also update the web content to "meta" 806.

At 408, the one or more rendering rules, in response to an execution by a computerized device (e.g., system 200) having a display (e.g., display 216), dynamically configure the content to the typesetting for the display, such as those in FIG. 3C.

Figure 5:
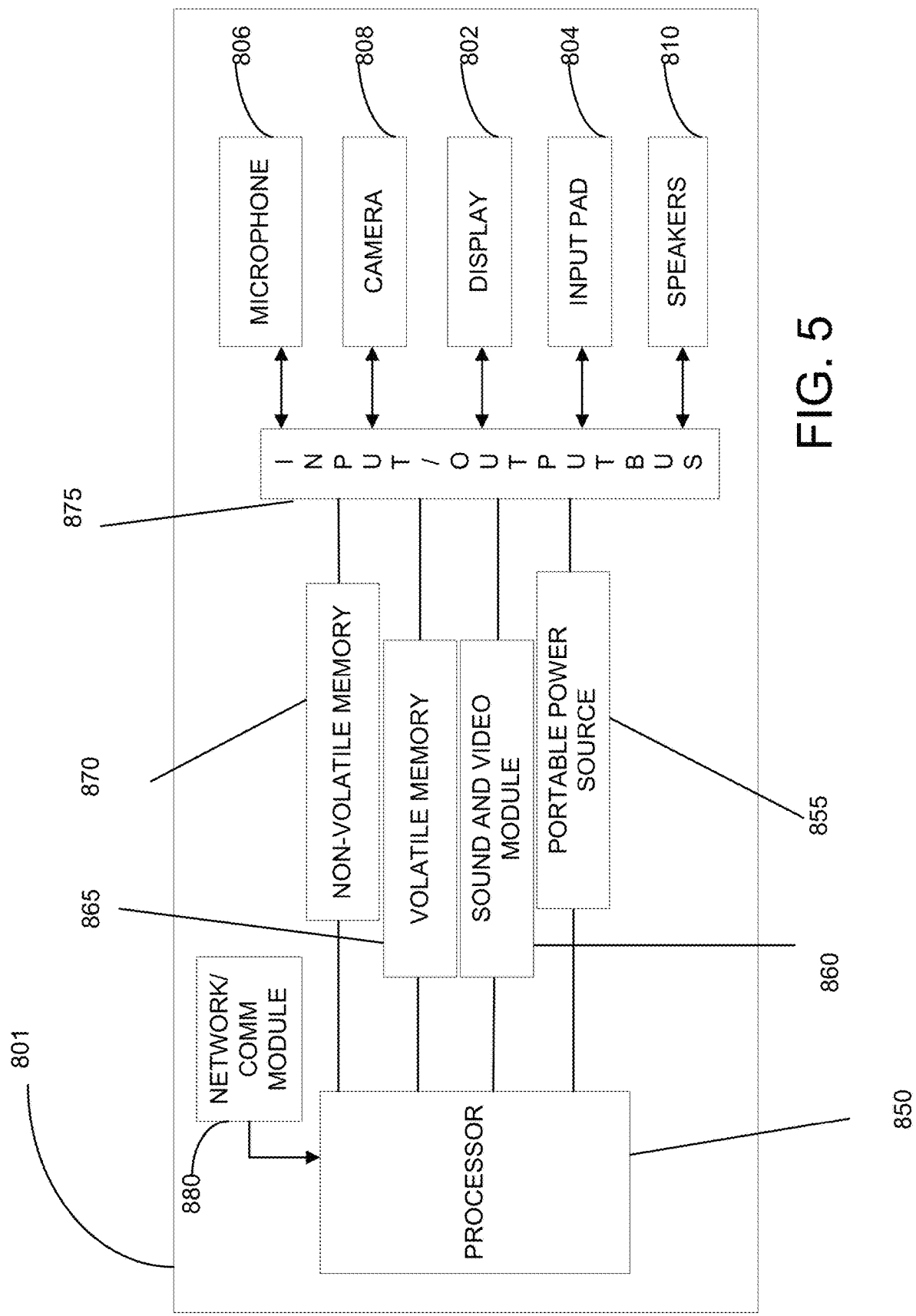
FIG. 5 is a diagram illustrating a portable computing device according to one embodiment.
Figure 6:
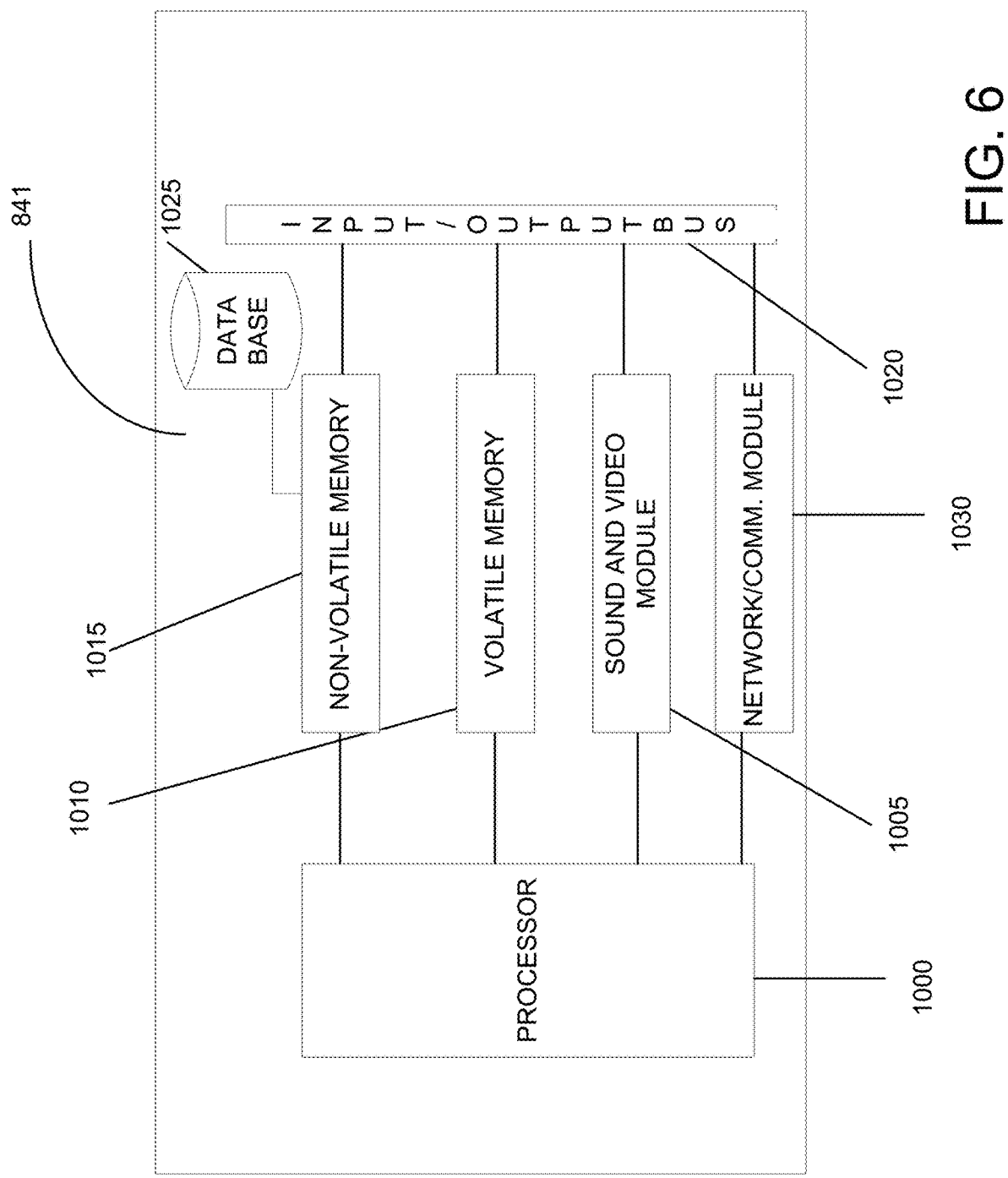
FIG. 6 is a diagram illustrating a computing device according to one embodiment.

FIG. 5 may be a high level illustration of a portable computing device 801 communicating with a remote computing device 841 in FIG. 6 but the application may be stored and accessed in a variety of ways. In addition, the application may be obtained in a variety of ways such as from an app store, from a web site, from a store Wi-Fi system, etc. There may be various versions of the application to take advantage of the benefits of different computing devices, different languages and different API platforms.

In one embodiment, a portable computing device 801 may be a mobile device 108 that operates using a portable power source 855 such as a battery. The portable computing device 801 may also have a display 802 which may or may not be a touch sensitive display. More specifically, the display 802 may have a capacitance sensor, for example, that may be used to provide input data to the portable computing device 801. In other embodiments, an input pad 804 such as arrows, scroll wheels, keyboards, etc., may be used to provide inputs to the portable computing device 801. In addition, the portable computing device 801 may have a microphone 806 which may accept and store verbal data, a camera 808 to accept images and a speaker 810 to communicate sounds.

The portable computing device 801 may be able to communicate with a computing device 841 or a plurality of computing devices 841 that make up a cloud of computing devices 811. The portable computing device 801 may be able to communicate in a variety of ways. In some embodiments, the communication may be wired such as through an Ethernet cable, a USB cable or RJ6 cable. In other embodiments, the communication may be wireless such as through Wi-Fi® (802.11 standard), BLUETOOTH, cellular communication or near field communication devices. The communication may be direct to the computing device 841 or may be through a communication network 102 such as cellular service, through the Internet, through a private network, through BLUETOOTH, etc., FIG. 5 may be a simplified illustration of the physical elements that make up a portable computing device 801 and FIG. 6 may be a simplified illustration of the physical elements that make up a server type computing device 841.

FIG. 5 may be a sample portable computing device 801 that is physically configured according to be part of the system. The portable computing device 801 may have a processor 850 that is physically configured according to computer executable instructions. It may have a portable power supply 855 such as a battery which may be rechargeable. It may also have a sound and video module 860 which assists in displaying video and sound and may turn off when not in use to conserve power and battery life. The portable computing device 801 may also have non-volatile memory 865 and volatile memory 870. It may have GPS capabilities 880 that may be a separate circuit or may be part of the processor 850. There also may be an input/output bus 875 that shuttles data to and from the various user input devices such as the microphone 806, the camera 808 and other inputs, such as the input pad 804, the display 802, and the speakers 810, etc., It also may control of communicating with the networks, either through wireless or wired devices.

Of course, this is just one embodiment of the portable computing device 801 and the number and types of portable computing devices 801 is limited only by the imagination.

As a result of the system, better information may be provided to a user at a point of sale. The information may be user specific and may be required to be over a threshold of relevance. As a result, users may make better informed decisions. The system is more than just speeding a process but uses a computing system to achieve a better outcome.

The physical elements that make up the remote computing device 841 may be further illustrated in FIG. 6. At a high level, the computing device 841 may include a digital storage such as a magnetic disk, an optical disk, flash storage, non-volatile storage, etc. Structured data may be stored in the digital storage such as in a database. The server 841 may have a processor 1000 that is physically configured according to computer executable instructions. It may also have a sound and video module 1005 which assists in displaying video and sound and may turn off when not in use to conserve power and battery life. The server 841 may also have volatile memory 1010 and non-volatile memory 1015.

The database 1025 may be stored in the memory 1010 or 1015 or may be separate. The database 1025 may also be part of a cloud of computing device 841 and may be stored in a distributed manner across a plurality of computing devices 841. There also may be an input/output bus 1020 that shuttles data to and from the various user input devices such as the microphone 806, the camera 808, the inputs such as the input pad 804, the display 802, and the speakers 810, etc., The input/output bus 1020 also may control of communicating with the networks, either through wireless or wired devices. In some embodiments, the application may be on the local computing device 801 and in other embodiments, the application may be remote 841. Of course, this is just one embodiment of the server 841 and the number and types of portable computing devices 841 is limited only by the imagination.

The user devices, computers and servers described herein may be computers that may have, among other elements, a microprocessor (such as from the Intel® Corporation, AMD®, ARM®, Qualcomm®, or MediaTek®); volatile and non-volatile memory; one or more mass storage devices (e.g., a hard drive); various user input devices, such as a mouse, a keyboard, or a microphone; and a video display system. The user devices, computers and servers described herein may be running on any one of many operating systems including, but not limited to WINDOWS®, UNIX®, LINUX®, MAC® OS®, iOS®, or Android®. It is contemplated, however, that any suitable operating system may be used for the present invention. The servers may be a cluster of web servers, which may each be LINUX® based and supported by a load balancer that decides which of the cluster of web servers should process a request based upon the current request-load of the available server(s).

The user devices, computers and servers described herein may communicate via networks, including the Internet, wide area network (WAN), local area network (LAN), Wi-Fi®, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of embodiments may become apparent to those skilled in the art upon review of the disclosure. The scope embodiments should, therefore, be determined not with reference to the above description, but instead should be determined with reference to the pending claims along with their full scope or equivalents.

One or more features from any embodiment may be combined with one or more features of any other embodiment without departing from the scope embodiments. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it may be understood by those of ordinary skill in the art having the present specification, figures and claims before them, that the corresponding structure includes a computer, processor, or microprocessor (as the case may be) programmed to perform the particularly recited function using functionality found in a computer after special programming and/or by implementing one or more algorithms to achieve the recited functionality as recited in the claims or steps described above. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one embodiments to the embodiments illustrated.

The present disclosure provides a solution to the long-felt need described above. In particular, the systems and methods overcome challenges with traditional approaches of manual entry of data in order to monitor and track application development. Aspects of embodiments create a data structure to represent code and applications so that during the lifecycle of the code, an administrator or manager may easily identify and score aspects of the application.

Further advantages and modifications of the above described system and method may readily occur to those skilled in the art.

The disclosure, in its broader aspects, is therefore not limited to the specific details, representative system and methods, and illustrative examples shown and described above. Various modifications and variations may be made to the above specification without departing from the scope or spirit of the present disclosure, and it is intended that the present disclosure covers all such modifications and variations provided they come within the scope of the following claims and their equivalents.

What is claimed is:

1. A computer implemented method for providing a dynamic typesetting package comprising:
   receiving a request from a user for a typesetting package to be served externally to contexts for rendering on a computerized device, the typesetting package comprising one or more font and one or more rendering rules for defining a typesetting for various elements of a content from a user across the contexts; said typesetting comprising configurations of layouts of the elements across the contexts;
   in response to a requested typesetting package, providing a link to the user, the link referencing the requested typesetting package;
   in response to the link being executed, matching at least a portion of the elements of the content to one or more parameters in the one or more rendering rules; and
   wherein the one or more rendering rules, in response to an execution by the computerized device having a display context, dynamically configure and reorganize the elements in accordance with the layouts of the typesetting and provide progressive changes to the layouts in response to changes to instructions from the user.

2. The computer implemented method of claim 1, wherein the content comprise a collection of texts and graphics, said content are coded in a markup language.

3. The computer implemented method of claim 1, wherein providing the link comprises providing the link in response to a user action, wherein the user action comprises obtaining the link and copying the link to any part of the content.

4. The computer implemented method of claim 1, wherein matching comprises matching in response to a user selection.

5. The computer implemented method of claim 4, wherein the user selection comprises a selection of a markup language format name.

6. The computer implemented method of claim 4, wherein the user selection comprises a name for a typesetting style.

7. A system for providing a dynamic typesetting package comprising:
   a database for storing one or more typesetting packages;
   a server configured to execute computer-executable instructions for:
   receiving a request from a user for one of the one or more typesetting packages to be served externally to contexts for rendering on a computerized device, each of the typesetting packages comprising one or more font typeface and one or more rendering rules for defining the typesetting for various elements of a content from a user across contexts, said contexts comprising a set of parameters of a display context of the rendering device; said typesetting comprising configurations of layouts of the elements across the contexts;
   in response to a requested typesetting package, providing a computer-executable link to the user, the computer-executable link referencing the requested typesetting package;
   in response to the link being executed, matching at least a portion of the elements of the content to one or more parameters in the one or more rendering rules; and
   wherein the one or more rendering rules, in response to an execution by the rendering device, dynamically configure the elements in accordance with the layouts of the typesetting and provide progressive changes to the layouts in response to changes to instructions from the user.

8. The system of claim 7, wherein the content comprise a collection of texts and graphics, said content are coded in a markup language with format declarations and the one or more parameters for the format declarations.

9. The system of claim 7, wherein the server is configured to provide the computer-executable link in response to a user action, wherein the user action comprises obtaining the computer-executable link and copying the computer-executable link to any part of the content.

10. The system of claim 7, wherein the server is configured to match in response to a user selection.

11. The system of claim 10, wherein the user selection comprises a selection of a markup language format name.

12. The system of claim 10, wherein the user selection comprises a name for a typesetting style.

13. The system of claim 7, wherein the server is configured to match automatically in response to the computer-executable link being provided to the content.

14. The system of claim 7, wherein the computer-executable link comprises a collection of texts and graphics, said content are coded in a markup language.

15. A tangible non-transitory computer readable medium stored thereon computer-executable instructions for providing a dynamic typesetting package, the computer-executable instructions comprising:
   receiving a request from a user for a typesetting package to be served externally to contexts for rendering on a computerized device, the typesetting package comprising one or more font and one or more rendering rules for defining a typesetting for various elements of a content from a user across contexts, said contexts comprising a set of parameters of a display context of the computerized device; said typesetting comprising configurations of layouts of the elements across the contexts;
   in response to a requested typesetting package, providing a link to the user, the link referencing the requested typesetting package;
   in response to the link being executed, matching at least a portion of the elements of the content to one or more parameters in the one or more rendering rules; and
   wherein the one or more rendering rules, in response to an execution by the computerized device having the display context, dynamically configure the elements in accordance with the layouts of the typesetting and provide progressive changes to the layouts in response to changes to instructions from the user.

16. The computer implemented method of claim 15, wherein the content comprise a collection of texts and graphics, said content are coded in a markup language with format declarations and the one or more parameters for the format declarations.

17. The computer implemented method of claim 15, wherein the link comprises a link to a cascading style sheet and a scripting language file.

18. The computer implemented method of claim 15, wherein matching comprises matching in response to a user selection.

19. The computer implemented method of claim 18, wherein the user selection comprises a selection of a markup language format name.

20. The computer implemented method of claim 18, wherein the user selection comprises a name for a typesetting style.

* * * * *